April 14, 1970     P. A. M. GELL     3,506,769
FURNACES FOR SUPPLYING MOLTEN GLASS
Filed Aug. 19, 1968
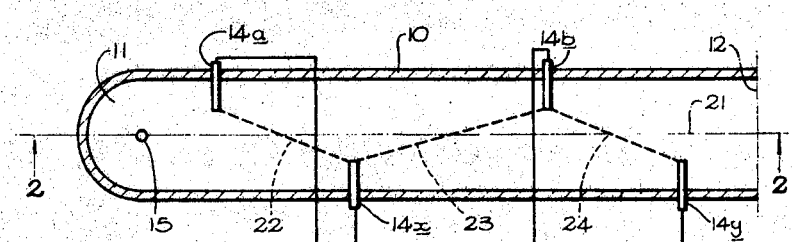
FIG. 1.
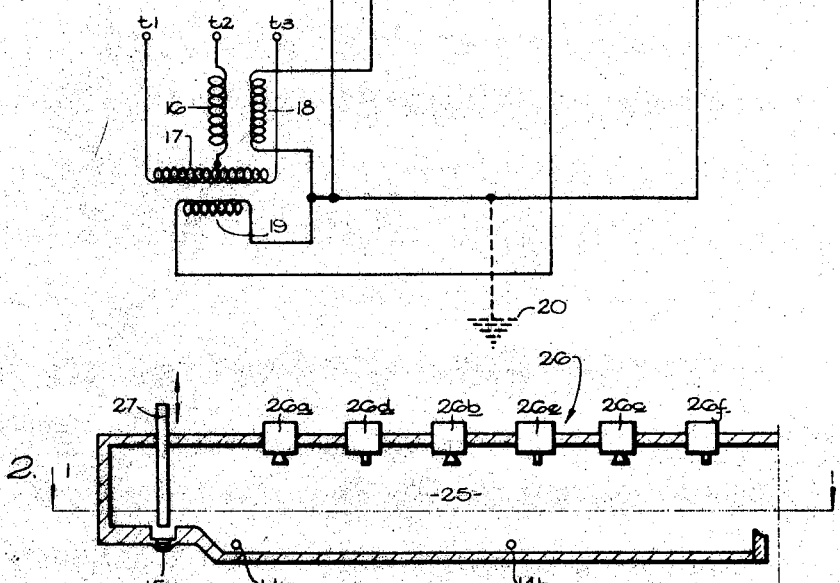
FIG. 2.
FIG. 3.
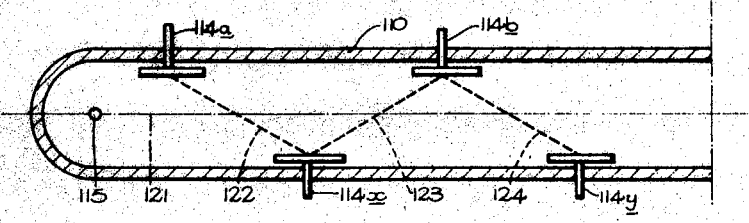
FIG. 4.
INVENTOR:
PHILIP ANTHONY MAUNSELL GELL
BY Kurt Kelman
AGENT

United States Patent Office 3,506,769
Patented Apr. 14, 1970

3,506,769
FURNACES FOR SUPPLYING MOLTEN GLASS
Philip Anthony Maunsell Gell, Enville, Stourbridge, England, assignor to Elemelt Limited, Stafford, England, a British company
Filed Aug. 19, 1968, Ser. No. 753,480
Claims priority, application Great Britain, Aug. 17, 1967, 37,914/67
Int. Cl. C03b 5/02
U.S. Cl. 13—6                                10 Claims

ABSTRACT OF THE DISCLOSURE

A glass feeder duct for feeding molten and refined glass from a furnace chamber to a feeder chamber subjected to heating by passage of electrical current through the glass in the feeder duct along a generally zig-zag path between at least two electrode means adjacent to each side of the duct, the electrode means at one side being longitudinally offset or staggered relatively to the electrode means at the other side.

BACKGROUND OF THE INVENTION

Field of the invention

This invention relates to a method of supplying molten and refined glass (which term is to be deemed to include vitreous materials generally) from a source of such glass to a feeder chamber from which it is required to be delivered for fabrication or other use and wherein the molten glass is caused to flow in a generally horizontal direction along a feeder duct extending between the source of glass, such as a furnace chamber and a feeder chamber.

The method will hereinafter be referred to as a method of supplying molten glass of the kind specified.

The invention also relates to a furnace assembly comprising a furnace chamber in which glass is melted and one or more feeder chambers are connected thereto, each by a respective feeder duct extending in a generally horizontal direction. Such furnace assemblies are hereinafter referred to as being of the kind specified.

Description of the prior art

In my prior U.S. Patent No. 3,030,434 I have described and claimed a method of melting glass and supplying molten glass of the kind specified characterised in that the molten glass in the feeder duct is subjected to the passage therethrough longitudinally of the duct of alternating electric current from glass permeable electrode means or electrode means having parts bordering the bottom wall and side walls of the duct and affording a clear passage to a substantial proportion of the glass flow, such electrode means being spaced apart longitudinally in the duct, lying in planes transverse to the length of the duct, and communicating such current to the duct over a sufficiently large proportion of the cross-sectional area of the glass in the duct (in a plane transverse to its length) as to establish or promote uniformity of temperature over such cross-sectional area.

Whilst the method described and claimed in my prior patent aforesaid does enable better control to be exercised than has heretofore been possible over the temperature of the glass as it flows along the feeder duct, the form of furnace assembly specifically described and illustrated in my prior patent includes a duct wherein the electrode span the whole width of the duct so that inevitably there is some physical restriction to the flow of glass along the duct.

If, on the other hand, heat is supplied to the glass in the duct by means of electrodes situated adajacent to the side walls and affording current paths extending at right angles to the direction of flow of glass along the duct, a large number of such electrodes require to be provided unless the uniformity of heating of the glass in the duct is to be impaired and this materially increases the cost of construction. Further, there is difficulty in preventing the current flow becoming concentrated between a particular pair of oppositely disposed electrodes or between a particular local area of the current communicating faces of a pair of such opposed electrodes if the opposed electrodes are connected to a source of alternating current with all the electrodes on one side of the duct connected to one pole of this source and all the electrodes on the other side of the duct connected to the other pole of the source.

SUMMARY OF THE INVENTION

In a glass melting furnace assembly comprising a furnace chamber for containing the molten glass, at least one feeder chamber from which the molten glass is delivered, a feeder duct connecting said furnace chamber to said feeder chamber and along which glass flows from the former and the latter, a plurality of electrode means in said feeder duct below the normal surface level of molten glass therein, and supply circuit means for supplying electric current to said electrode means and through the molten glass in the feeder duct, the invention provides the improvement wherein said electrode means are mounted in said feeder duct adjacent to opposite sides thereof, there are at least two of said electrode means at each of said sides and these electrode means are spaced apart longitudinally of each other, and the supply circuit means has output terminals connected respectively to only said electrode means on opposite sides of said duct and offset longitudinally from each other.

Further, the invention resides in the method of supplying molten and refined glass from a source of such glass to a feeder chamber comprising the steps of flowing the glass along a feeder duct from said source to said feeder chamber, passing alternating current through the glass in the feeder duct along a generally zig-zag path etxending lonitudinally of the feeder duct between at least two electrode means at each of opposite sides of said feeder duct.

BRIEF DESCRIPTION OF THE DRAWINGS

The invention is illustrated in the accompanying drawings wherein:—

FIGURE 1 is a view in plan and in cross-section on the line 1—1 of FIGURE 2 of one arrangement of electrodes and supply circuit in a feeder duct in accordance with the invention;

FIGURE 2 is a view in cross-section on the line 2—2 of FIGURE 1 omitting the supply circuit;

FIGURE 3 is a view of an alternative embodiment similar to FIGURE 1 utilising plate electrodes and omitting the supply circuit for clarity; and FIGURE 4 is a fragmentary view of a modification of the embodiment of FIGURE 3.

DESCRIPTION OF THE PREFERRED EMBODIMENT

The feeder duct 10 may form part of a furnace assembly of the kind specified which incorporates a melting and refining furnace proper, for example, of the form described and claimed in my prior U.S. Patent No. 2,899,476 and providing a source of molten and refined glass required to be conveyed by the feeder duct to a feeder chamber indicated generally at 11. The feeder duct 10 may be of any length required to enable the requisite degree of uniformity as to the temperature of glass in the duct to be established before the glass reaches the feeder chamber 11 after having been delivered from the melting and refining furnace proper which would be connected to the end 12 of the feeder duct. Typically the feeder duct may have a length of about 20 ft. The feeder duct 10 may be of channel shape in cross-section and is preferably closed at its upper side by a roof. The level of glass in the feeder duct may be such that a free space 25 exists between the upper surface of the glass and the roof and in this space heat exchange means 26 may be provided comprising a plurality of heat exchange devices situated at positions spaced apart along the length of the feeder duct. Such devices may comprise fuel fed burners 26a to 26c to enable heat to be supplied to the glass, alternatively, or in addition, they may comprise cooling devices such as nozzles 26d to 26f by means of which jets of cooling gas, such as air, can be delivered into the space above the glass or as more fully described and claimed in my U.S. patent application Ser. 373,613 filed June, 9, 1964.

To enable heat to be supplied to the glass below the level of its surface a plurality of electrodes are provided along each of the side walls 13 of the duct. Those along one side are indicated at 14a, 14b whereas those situated along the other side of the duct are indicated at 14x, 14y.

As described in more detail in my U.S. patent application Ser. No. 373,613 filed June 9, 1964, the temperature of the glass in a lower zone immediately adjacent to the bottom wall of the duct and fed into the latter at the right-hand end 12 thereof, as seen in the drawings, is ordinarily somewhat below the final temperature at which the glass is required to be fed out from the orifice 15 of the feeder chamber 11 under the control of plunger 27 reciprocated in the direction of arrow 28.

The purpose of the electrodes is to enable current to be passed through the glass to cause this to be heated by the Joule effect in such a manner as to gradually raise the temperature of the glass in the lower zone of the body of glass contained in the feeder duct so that this reaches the required temperature at the time that the glass has arrived at the orifice 15.

At the same time it is important to avoid obstructing the flow of glass towards the orifice 15 and consequently there are some advantages in employing electrodes which do not span the whole distance from one side wall to the other side wall of the glass immediately adjacent to the bottom wall thereof.

If, however, electrodes disposed immediately opposite each other, for example, were connected to a source of electric current, the current path would tend to become concentrated in a relatively narrow barrel-shaped zone extending between these two electrodes whilst bodies of glass between the successive pairs of opposed electrodes would receive very little, if any, heat.

In the arrangement now described electrodes 14a, 14b extend inwardly of the channel at one side, e.g. through one side wall, and electrodes 14x, 14y extend similarly through the opposite side wall with the two pairs 14a, 14b and 14x, 14y staggered or offset longitudinally.

A three-phase to two-phase Scott-connected transformer arrangement has input terminals t1, t2, t3 for connection to a three-phase alternating electric current supply feeding primary windings 16 and 17. Secondary windings 18, 19 are connected respectively to electrodes 14a, 14x and 14b, 14y with one end of each secondary winding connected in common to the electrodes 14a, 14y occupying the end positions and preferably earthed as indicated at 20. This provides equal phase voltages at terminals of the secondary windings 18, 19, and an interphase voltage of substantially 1.4 times each phase voltage between the terminals of windings 18, 19 remote from their common terminal.

With this arrangement current paths are established obliquely of a medial longitudinal reference axis 21 of the channel, as indicated by the broken lines 22, 23, 24, joining the inner lateral extremities of the electrodes to each other which, as shown, in each case are offset laterally from the reference axis 21. The lengths of these current paths correspond at least approximately to the voltage between the electrodes at its ends. Thus, path 23 is about 1.4 times the lengths of paths 22 or 24.

The electrodes may, however, project across the width of the channel up to the reference axis if desired to provide the required area of current communicating face at each electrode to avoid production of bubbles (or seed as it is termed) due to too high a current density. In this case some current would flow between the inner extremities of successive electrodes in a direction parallel with the reference axis, but generally the current path would still be oblique to this axis.

It will further be noted that, as determined for reference purposes by lines connecting the inner lateral extremities of the electrodes, the current path between the electrodes makes an acute included angle with the reference axis 21 of a value of some 20°. It will be understood that it is preferred that this acute angle should not be substantially greater than 45°.

In the alternative embodiment illustrated in FIGURE 3 parts corresponding to those already described are designated by like numerals of reference with the prefix 1.

In this arrangement plate-type electrodes are utilised instead of the rod electrodes 14a, 14b, 14x and 14y.

The plates may, as shown in FIGURE 3, be arranged in each case parallel to the adjacent side wall of the feeder duct and spaced inwardly therefrom by a short distance. The plate is supported by an electrode stem extending through the side wall as shown.

Alternatively, in the modification illustrated in FIGURE 4 wherein parts corresponding to those already described are designated by like numerals of reference with the prefix 2, the inwardly presented faces of the electrode plates may be arranged flush with the inwardly presented surface of the adjacent side wall of the feeder duct. Thus, in the fragmentary view shown the electrode 214x is embedded or contained in a recess formed in the side wall of the feeder duct 210 to provide this relationship between its inwardly resented face and that of the side wall of the feeder duct.

It will be understood that a supply circuit similar to that illustrated in FIGURE 1 would be utilised with the arrangement of electrodes illustrated in FIGURE 3, whether incorporating the modification of FIGURE 4 or not.

I claim:

1. A glass melting furnace assembly comprising a furnace chamber for containing the molten glass, at least one feeder chamber from which the molten glass is delivered, a feeder duct connecting said furnace chamber to said feeder chamber and along which glass flows from the former and the latter, a plurality of electrode means in said feeder duct below the normal surface level of molten glass therein, supply circuit means for supplying electric current to said electrode means and through the molten glass in the feeder duct, said electrode means being mounted in said feeder duct adjacent to opposite sides thereof, are at least two of said electrode means being at each of said sides and spaced apart longitudinally of each other, and the supply circuit means having output terminals connected respectively to only said electrode means on opposite sides of said duct and offset longitudinally from each other.

2. The glass melting furnace according to claim 1 wherein each of said electrode means at one of said sides is offset longitudinally from the nearest one of said electrode means at the other of said sides.

3. The glass melting furnace according to claim 2 wherein:

(a) the supply circuit means comprises (i) transformer means for providing alternating phase voltages out of phase with each other, and an interphase voltage,
(ii) conductor means connecting one of said phase voltages between one of said electrode means, at one side of said feeder duct, and the nearest one of said electrode means at the other side of said feeder duct, and connecting the other of said phase voltages between the next succeeding one of said electrode means at said one side and the next succeeding one of said electrode means at said other side proceeding in the same direction along said feeder duct whereby the interphase voltage is applied between the second said and the third said of the electrode means,
(b) the shortest distances between the first and second, third and fourth, and second and third, said electrode means is substantially in the ratio of the respective phase voltages, and interphase voltage applied therebetween.

4. The glass melting furnace according to claim 3 wherein the phase voltages are equal to, and are in quadrature with, each other and the interphase voltage has a value of substantially 1.4 times that of each of the phase voltages.

5. The glass melting furnace according to claim 2 wherein:
(a) each of said electrode means has its laterally inner extremity offset laterally outwardly from a medial longitudinally extending reference axis in a direction towards the side of the feeder duct at which the electrode means is mounted,
(b) lines adjoining longitudinally successive electrode means make acute included angles with said reference axis of a value not substantially greater than 45 degrees.

6. The glass melting furnace according to claim 1 wherein each electrode means comprises a rod-like body extending through a side wall of the duct and projecting laterally inwardly of the inner surface of said side wall for a distance such that the inner extremity of said electrode means lies between a medial longitudinally extending reference axis and said inner surface.

7. The glass melting furnace according to claim 1 wherein:
(a) each of said electrode means comprises a body of plate-like form,
(b) said electrode bodies are mounted in said duct at positions spaced laterally inwardly from an adjacent side wall of said duct,
(c) said bodies have inwardly presented faces parallel with the inwardly presented face of said adjacent side wall.

8. The glass melting furnace according to claim 1 wherein:
(a) each of said electrode means comprises a plate-like body,
(b) said bodies are mounted in adjacent side walls of said duct,
(c) said bodies have inwardly presented faces substantially flush with the inwardly presented face of the adjacent side wall.

9. The glass melting furnace according to claim 1 wherein heat exchange means are provided to operate in the duct at a level above the normal level of molten glass therein, and along that part of the duct wherein the glass is traversed by electric current flowing between said electrode means.

10. The glass melting furnace according to claim 9 wherein said heat exchange means comprises the combination of fuel fed burners and nozzles for supplying cooling fluid to said space operable selectively to supply heat to, or extract heat from, the surface of the glass in said feeder duct to promote uniformity of temperature of the glass in said feeder chamber.

References Cited

UNITED STATES PATENTS

| 2,490,339 | 12/1949 | De Voe | 13—6 |
| 2,902,524 | 9/1959 | Paxton | 13—6 |
| 3,108,149 | 10/1963 | Carney et al. | 13—6 |
| 3,182,113 | 5/1965 | Frazier et al. | 13—6 |

FOREIGN PATENTS 620,763  3/1949  Great Britain.

H. B. GILSON, Primary Examiner

U.S. Cl. X.R.

13—24